United States Patent [19]

Becker

[11] B 3,995,424
[45] Dec. 7, 1976

[54] FLUID CLUTCHES

[75] Inventor: John E. Becker, Bowmanville, Canada

[73] Assignee: Cluaran Associates Ltd., Oshawa, Canada

[22] Filed: Jan. 16, 1975

[21] Appl. No.: 541,464

[44] Published under the second Trial Voluntary Protest Program on February 17, 1976 as document No. B 541,464.

[30] Foreign Application Priority Data

Jan. 28, 1974 United Kingdom ............... 3810/74

[52] U.S. Cl. .................................... 60/349; 60/350; 60/351; 60/364
[51] Int. Cl.[2] ........................................ F16D 33/04
[58] Field of Search ............ 60/330, 334, 347, 349, 60/350, 351, 364

[56] References Cited

UNITED STATES PATENTS

| 2,270,545 | 1/1942 | Neracher et al. ...................... 60/350 |
| 2,359,930 | 10/1944 | Miller ................................... 60/350 |
| 3,237,409 | 3/1966 | Becker ................................ 60/351 |

*Primary Examiner*—Edgar W. Geoghegan
*Attorney, Agent, or Firm*—Hirons & Rogers

[57] ABSTRACT

The invention relates to a fluid clutch of the kind comprising cooperating vaned pump and turbine elements between which toroidal power-transmitting liquid vortices are established. At least part of the vanes of one of the elements is movable between clutch engaged and disengaged portions through a wall of the element into a reservoir on the other side of the wall. This reservoir also serves as a stall reservoir into which working liquid is fed automatically upon the existence of a stall condition of the element, so as to reduce the torque transmission capacity to a value preventing stalling of the prime mover.

8 Claims, 2 Drawing Figures

FLUID CLUTCHES

FIELD OF THE INVENTION

The present invention is concerned with improvements in or relating to fluid clutches of the type comprising cooperating pump and turbine elements between which toroidal power-transmitting liquid vortices can be established under control of an operator.

REVIEW OF THE PRIOR ART

In one specific form of fluid clutch proposed hitherto the said pump and turbine elements are provided with respective radially-extending sets of vanes, and the pump set is mounted to be movable axially through the wall of its element between a fully-inserted clutched position in which they are fully operative inside the element, and a fully-withdrawn declutched position in which power is not transmitted since essentially no vortices can be maintained.

Fluid clutches of the kind specified are usually provided in a drive system between a load and a driving prime mover, and the possibility always exists that the load will be stalled, thereby causing the coupling to impose many times the normal driving torque on the prime mover. Such an overload of the prime mover may also exist during the start up of a heavy load. The excessive torques that consequently are applied to the prime mover may cause it to slow down and even stall, and can cause serious damage thereof, so that the clutch must be provided with means for preventing their transmission. Examples of couplings provided with such protection are described, for example, in my U.S. patent specification Ser. No. 3,237,409 issued Mar. 1, 1966.

DEFINITION OF THE INVENTION

It is an object of the invention to provide a new fluid clutch of the kind employing movable vanes or parts thereof to effect the clutching and declutching operation.

It is a more specific object to provide a new fluid clutch including a new means for control of maximum stall or overload torque therein, and clutching and declutching thereof, by control of the establishment of the power-transmitting vortices by use of movable vanes or parts thereof.

It is a further object to provide a new fluid clutch having a reservoir compartment into which working liquid from the working compartment can be introduced to control the maximum stall or overload torque transmission of the clutch.

In accordance with the present invention there is provided a fluid clutch comprising power input and power output means, a pump element and a turbine element connected respectively to the power input and power output means for rotation thereby and providing respectively cooperating pump and turbine chambers rotatable about the same axis and constituting a working chamber, a quantity of working liquid in the working chamber, each element comprising a respective annular shell and a respective set of radially-extending vortex producing vanes, the pump element comprising another annular shell axially spaced from and rotatable with the respective element shell to form a corresponding stall reservoir compartment therebetween, at least some of the vanes of the pump element being connected by a respective connecting member which is mounted for movement within the stall reservoir compartment for movement of the vanes or vane portions connected thereto into and out of vortex-producing operative cooperation with the set of turbine vanes, means connected to the said connecting member for moving the movable pump vanes or vane portions from a clutch-engaged position to a clutch-disengaged position and vice-versa, and means for automatically feeding fluid from the working chamber upon the existence of a stall condition of the turbine element relative to the pump element.

Preferably, the said connecting member has the form of an annular shell conforming approximately to the shape of the pump element annular shell, the two said shells in the clutch engaged position of the connecting member forming between themselves an auxiliary reservoir receiving working fluid that leaks from the working chamber, the said auxiliary reservoir including means for returning liquid entering therein to the working chamber.

The said means for automatically feeding fluid from the working chamber comprise catch means at the radially inner part of the turbine element feeding the fluid at stall to passage means in the pump element and thence to the stall reservoir.

DEFINITION OF THE DRAWINGS

A fluid clutch which is a particular preferred embodiment of the invention will now be described, by way of example, with reference to the accompanying diagrammatic drawings, wherein:

FIG. 1 is a longitudinal cross section, in a plane containing the common rotational axis of the two clutch elements, of the upper part of the clutch and showing it in its clutched condition, and FIG. 2 is a similar view to FIG. 1 showing the clutch in its declutched condition.

DESCRIPTION OF THE PREFERRED EMBODIMENTS

Figure 1:
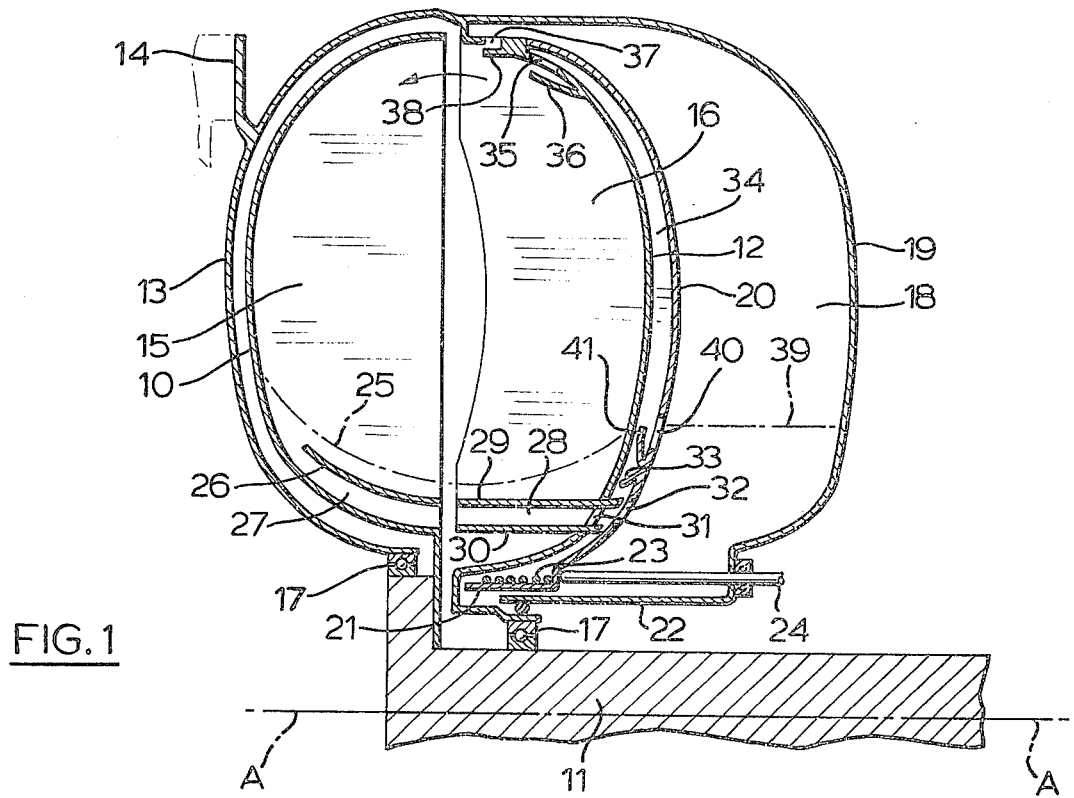

The clutch particularly illustrated herein comprises a turbine element 10 connected to a power output shaft 11 that is in turn adapted to be connected to apparatus to be driven via the clutch. A pump element 12 has an extension 13 thereof surrounding the turbine element and can be connected to a prime mover such as a driving motor via flanges 14 that are bolted to a suitable driving wheel of the motor. The pump and turbine interiors together form the usual working chamber. The turbine interior is provided with fixed radially-extending vanes 15 while the pump interior is provided with radially-extending vanes 16. Seals and bearings 17 mount the pump member on the shaft 11 and permit free rotation relative thereto.

A liquid reservoir 18 is provided associated with the pump element by means of an extension 19 fixed to and rotatable with the pump element parts 12 and 13. This reservoir also serves as a compartment in which a radially-extending, vane-connecting member 20, of a shape to fit closely around the adjacent portion of the shell 12, is mounted for axial movement relative to the common axis A—A of the coupling elements. Thus, the member 20 has a cylindrical part 21 thereof that is mounted to slide freely axially upon a cylindrical part 22 of the extension 19. The member 20 carries the pump vanes and thereby connects them together for simultaneous axial movement with the member, each vane being a close sliding fit in a corresponding slot in the pump element shell 12. The member 20 is urged to the vane-withdrawn declutched position shown in FIG. 2 by means of a spring 23, and is moved to the vane-inserted clutched position of FIG. 1 by any suitable operator-controlled means, such as a pedal (not shown), via a push-rod 24.

Figure 2:
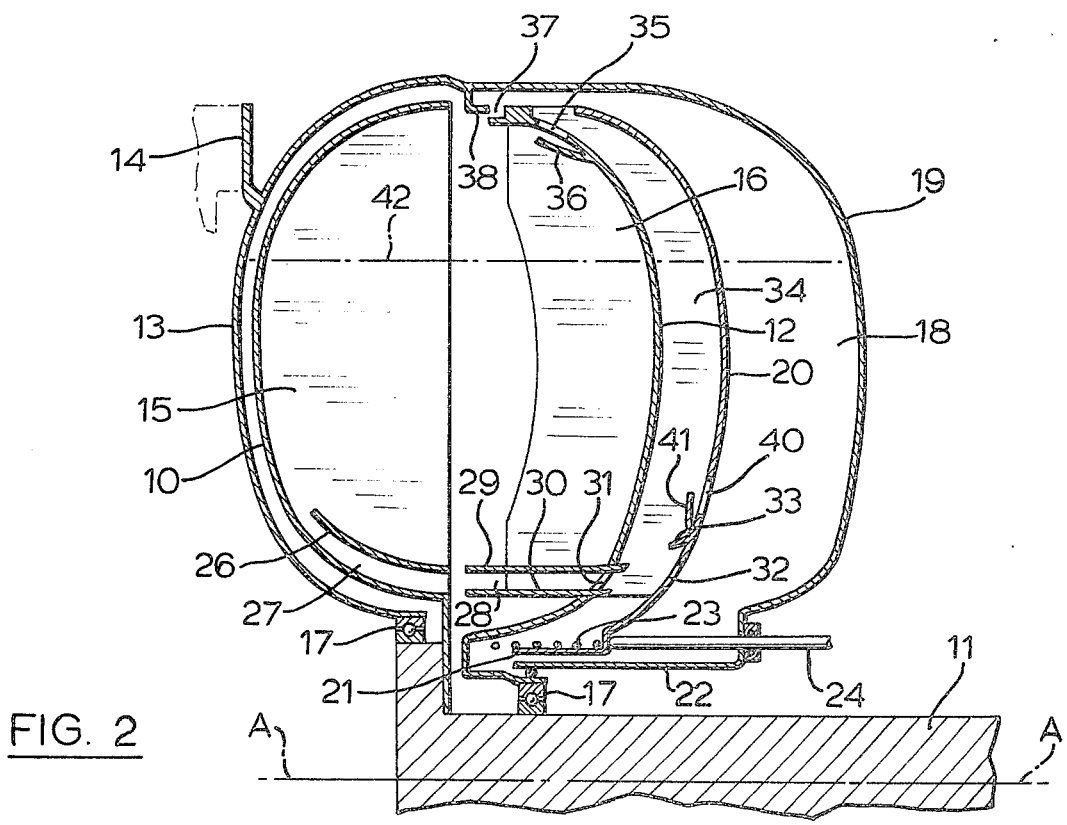

The radially-innermost boundary of normal liquid vortices in the working chamber is indicated by the broken line 25 in FIG. 1, and a series of catches 26 are provided in the turbine element between immediately adjacent pairs of vanes closer to the axis, so that they do not normally intercept the liquid forming these vortices. Any liquid intercepted by the catches is fed through the corresponding passage 27 to a pump passage 28 formed between guides 29 and 30, and thence through apertures 31 and 32 provided in the walls of shells 12 and 20 respectively into the compartment 18. The apertures 32 are provided with shields 33 to ensure that liquid passing between the apertures cannot escape into the auxiliary reservoir chamber 34 formed between the members 12 and 20.

Liquid will enter the auxiliary reservoir compartment 34 through the vane slits and during normal operation all such liquid is returned to the working compartment via relatively large openings 35 located at the radially outer periphery and provided with suction-creating hoods 36. The openings 35 perform an additional function of relieving to the working chamber any liquid trapped between the members 12 and 20 as the member 20 moves to the fully clutched position, thereby reducing the force required to move the member.

The liquid caught by the catches 26 and delivered to the reservoir 18 moves to the radially outer part thereof and is returned by apertures 37 to the working chamber, these apertures being provided with shields 38. The flow capacity of the openings 37 is sufficient to maintain the liquid level in the reservoir compartment 18 at a maximum level indicated by the broken line 39. In the event that a reservoir compartment 18 of adequate size for pump vane storage is too long to function properly as a stall storage reservoir, then the wall of the connecting member 20 is provided with over-flow apertures 40 that positively establish the level 39 by leaking liquid into the auxiliary reservoir 34 and thence through apertures 35 to the working chamber. Each aperture 40 is provided with a shield 41.

In operation with the movable pump vane portions 16 in the position shown in FIG. 1 normal liquid vortices are established in the working chamber and transmit power between the pump and turbine elements. As the operator progressively removes pressure from the rod 24 the spring 23 is operative to move the vanes 16 toward the position shown in FIG. 2, so that less and less of the vanes are exposed to the action of the vortices and the power transmission capacity of the clutch is reduced progressively. At some point in the axial movement the vortices will collapse completely and the clutch is effectively disengaged. In this condition the working fluid gathers as an annulus at the radially-outermost part of the interior of the shell formed by casings 13 and 19, the boundary being indicated by the broken line 42 in FIG. 2. Upon return movement of the shell 20 and the vanes toward the position shown in FIG. 1, at some point the vortices will become re-established and the clutch will become effectively engaged.

With the clutch operative to transmit torque if the turbine element is stalled the torque applied to the motor via the clutch will be many times normal, unless action is taken relatively quickly to reduce the clutch torque transmission capacity. Such action is obtained automatically since, with the slip between the turbine and pump elements substantially greater than the normal 3 %, the above-described approximately circular cross-section vortices are disrupted and instead the liquid flows over the interior wall of the coupling chambers to form "attenuated" vortices.

Upon the existence of the stall or overload condition and the establishment of the attenuated vortices the catches 26, passage 28 and the apertures 31 and 32 feed liquid into the reservoir 18 faster than it can be discharged from the apertures 37, so that the reservoir fills with liquid, reducing the quantity in the working circuit and consequently the torque transmission capacity. As normal conditions are re-established the reservoir will empty into the working circuit through the apertures 37 at a speed dependent on the flow capacity of those apertures.

Preferably, the relative flow capacities of the apertures 32 and 37 is such that a delayed filling of the reservoir is obtained, whereby the torque transmission capacity rises rapidly and temporarily to a predetermined amount above the designed stall capacity and upon maintenance of the condition decreases to the designed stall capacity. In a particular embodiment wherein the designed stall capacity is about 200% of the normal capacity, the said predetermined value to which the torque transmission is designed to rise temporarily is about 300% . Such an arrangement of slow filling enables the motor to struggle against a temporary overload and try to keep the driven machine operating under the over-load condition, before the coupling settles into the more limited stall or overload condition. The actual magnitude of this elevated transmission capacity will be determined by suitable choice of the length or position of the catches 26, and the size of compartment 18, and will depend upon factors such as the safe amount of heat that will be generated and can be dissipated by the coupling, and the overload the motor is capable of sustaining temporarily. This characteristic is especially useful with an electric motor, and in applications where the typical overload tends to be of short duration.

A clutch in accordance with the invention is thus able to make the chamber 18 serve the double purpose of accommodating the withdrawn vanes 16, and also to receive the working liquid withdrawn for maximum torque control. It is usually found that a chamber of correct size for one of these purposes is also at least approximately of correct size for the other purpose. A shield is not required for the turbine element since the turbine vanes are not exposed to liquid positively driven by the pump vanes in the declutched state. There is drag on the turbine in the declutched state since the liquid left in the working chamber if affected by friction with the shells 12 and 13 but the effect of this driven liquid will be very small, and the liquid that is rotated by the pump vanes is in the separate compartment 18. It will be apparent also that a simpler and shorter construction is achieved. Although in this embodiment the whole of all of the vanes 16 are moved for control of clutching in other embodiments not all of the vanes may be moved and/or part only of each vane may be moved.

I claim:

1. A fluid clutch comprising power input and power output means, a pump element and a turbine element connected respectively to the power input and power output means for rotation thereby and providing respectively cooperating pump and turbine chambers rotatable about the same axis and constituting a working chamber, a quantity of working liquid in the working chamber, each element comprising a respective annular shell and a respective set of radially-extending vortex producing vanes, the pump element comprising another annular shell axially spaced from and rotatable with the respective element shell to form a corresponding stall reservoir compartment therebetween, at least some of the vanes of the pump element being connected by a respective connecting member which is mounted for movement within the stall reservoir compartment for movement of the vanes or vane portions connected thereto into and out of vortex-producing operative cooperation with the set of turbine vanes, means connected to the said connecting member for moving the movable pump vanes or vane portions from a clutch-engaged position to a clutch-disengaged position and vice-versa, and means for automatically feeding fluid from the working chamber upon the existence of a stall condition of the turbine element relative to the pump element.

2. A fluid clutch as claimed in claim 1, wherein the said connecting member has the form of an annular shell conforming approximately to the shape of the pump element annular shell, the two said shells in the clutch engaged position of the connecting member forming between themselves an auxiliary reservoir receiving working fluid that leaks from the working chamber, and wherein the said auxiliary reservoir includes means for returing liquid entering therein to the working chamber.

3. A fluid clutch as claimed in claim 2, wherein the said means for returning liquid comprise apertures in the pump element shell adjacent the radially outermost part thereof, and suction-producing shields in the pump element effective to assist movement of liquid from the auxiliary reservoir to the working chamber.

4. A fluid clutch as claimed in claim 1, wherein the said means for automatically feeding fluid from the working chamber comprise catch means at the radially inner part of the turbine element feeding the fluid at stall to passage means in the pump element and thence to the stall reservoir.

5. A fluid clutch as claimed in claim 1, wherein the said connecting member has the form of an annular shell conforming approximately to the shape of the pump element annular shell, the two said shells in the clutch engaged position of the connecting member forming between themselves an auxiliary reservoir receiving working fluid that leaks from the working chamber, and wherein the said means for automatically feeding fluid from the working chamber comprise catch means at the radially inner part of the turbine element feeding the fluid at stall to passage means in the pump element and thence through the said auxiliary reservoir, and through apertures in the said annular shell connecting member into the stall reservoir.

6. A fluid clutch as claimed in claim 5, wherein the said apertures in the annular shell connecting member are provided with shields preventing entry of liquid passing through the apertures into the said auxiliary reservoir.

7. A fluid clutch as claimed in claim 1, wherein the means for feeding liquid from the working chamber have a first flow capacity, the means for feeding liquid from the stall reservoir to the working chamber has a second flow capacity, and the said flow capacities are so related that a delayed filling of the reservoir is obtained, whereby the clutch torque transmission capacity rises temporarily to a predetermined amount above the designed stall capacity and upon maintenance of the stall condition decreases to the designed stall capacity.

8. A fluid clutch as claimed in claim 1, wherein the said connecting member has the form of an annular shell conforming approximately to the shape of the pump element annular shell, the two said shells in the clutch engaged position of the connecting member forming between themselves an auxiliary reservoir receiving working fluid that leaks from the working chamber, and wherein the said connecting member annular shell is provided with overflow apertures feeding liquid from the stall reservoir into the auxiliary reservoir and establishing the effective volume of the stall reservoir.

* * * * *